(12) United States Patent
Keller et al.

(10) Patent No.: US 11,740,696 B2
(45) Date of Patent: *Aug. 29, 2023

(54) HEADWARE FOR COMPUTER CONTROL

(71) Applicants: Andrew Jay Keller, Norwalk, CT (US); Alexander Aziz Castillo Alvarez, Brooklyn, NY (US); Charles Bain, El Paso, TX (US)

(72) Inventors: Andrew Jay Keller, Norwalk, CT (US); Alexander Aziz Castillo Alvarez, Brooklyn, NY (US); Charles Bain, El Paso, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/839,955

(22) Filed: Jun. 14, 2022

(65) Prior Publication Data

US 2022/0308668 A1 Sep. 29, 2022

Related U.S. Application Data

(63) Continuation of application No. 17/130,312, filed on Dec. 22, 2020, now Pat. No. 11,360,559, which is a continuation of application No. 16/689,566, filed on Nov. 20, 2019, now Pat. No. 10,884,499.

(60) Provisional application No. 62/879,611, filed on Jul. 29, 2019, provisional application No. 62/769,714, filed on Nov. 20, 2018.

(51) Int. Cl.
*G06F 3/01* (2006.01)
*G06F 1/16* (2006.01)

(52) U.S. Cl.
CPC .............. *G06F 3/015* (2013.01); *G06F 1/163* (2013.01); *G06F 1/1698* (2013.01)

(58) Field of Classification Search
None
See application file for complete search history.

(56) References Cited

U.S. PATENT DOCUMENTS

| 6,291,824 B1 | 9/2001 | Battarbee et al. |
| 6,944,602 B2 | 9/2005 | Cristianini |
| 8,548,555 B2 | 10/2013 | Jin et al. |
| 10,884,499 B2 | 1/2021 | Keller et al. |

(Continued)

FOREIGN PATENT DOCUMENTS

WO 2014094036 A1 6/2014

OTHER PUBLICATIONS

Waytowich et al., "Spectral Transfer Learning Using Information Geometry for a User-Independent Brain-Computer Interface," Frontiers in Neuroscience, Sep. 22, 2016, pp. 1-15, vol. 10, Article 430.

(Continued)

*Primary Examiner* — Joseph R Haley
(74) *Attorney, Agent, or Firm* — Carter, DeLuca & Farrell LLP; George Likourezos

(57) ABSTRACT

A headware for computer control is presented in accordance with aspects of the present disclosure. In various embodiments, the headware includes an inner layer including a first surface and a second surface, an outer layer disposed on the first surface of the inner layer, and at least one sensor disposed on the second surface of the inner layer, and at least one sensor configured to measure electrical signals from a brain and extract meaning from the electrical signals, or communicate the electrical signals to a computing device. The headware is configured to sit at the top of a head and apply pressure to at least one side of the head.

14 Claims, 17 Drawing Sheets

(56) References Cited

U.S. PATENT DOCUMENTS

| | | |
|---|---|---|
| 11,360,559 B2 | 6/2022 | Keller et al. |
| 2005/0071301 A1 | 3/2005 | Kuroiwa |
| 2007/0133878 A1 | 6/2007 | Porikli et al. |
| 2011/0259335 A1 | 10/2011 | Sullivan |
| 2011/0298706 A1 | 12/2011 | Mann |
| 2012/0071780 A1 | 3/2012 | Barachant et al. |
| 2014/0200432 A1 | 7/2014 | Banerji et al. |
| 2016/0100758 A1 | 4/2016 | Jeong |
| 2016/0239084 A1 | 8/2016 | Connor |
| 2018/0348863 A1 | 12/2018 | Aimone |
| 2021/0141453 A1 | 5/2021 | Miller, III |

OTHER PUBLICATIONS

Parisi et al., "Ranking and Combining Multiple Predictors Without Labeled Data," PNAS, Jan. 28, 2014, pp. 1253-1258, vol. 111, No. 4.

HEADWARE FOR COMPUTER CONTROL

CROSS-REFERENCE TO RELATED APPLICATIONS

The present application is a continuation of U.S. patent application Ser. No. 17/130,312, filed on Dec. 22, 2020, now U.S. Pat. No. 11,360,559, which is a continuation of U.S. patent application Ser. No. 16/689,566, filed on Nov. 20, 2019, now U.S. Pat. No. 10,884,499, which claims priority to U.S. Provisional Patent Application No. 62/879,611, filed on Jul. 29, 2019, and U.S. Provisional Patent Application No. 62/769,714, filed on Nov. 20, 2018, the disclosures of all applications are incorporated by reference herein in their entireties.

TECHNICAL FIELD

The present application relates to computer control, and, in particular, to headware for computer control.

BACKGROUND

A brain-computer, which may also be referred to as a brain-computer interface (BCI), neural-control interface (NCI), mind-machine interface (MMI), direct neural interface (DNI), or brain-machine interface (BMI) is a communication pathway between a brain and a computer. These interfaces may employ a direct wired connection between the brain and a computing device.

Non-invasive neuroimaging techniques may be used to avoid the use of a direct wired connection to the brain. As an example, non-invasive EEG-based brain-computer interfaces have undergone experimental research. However, non-invasive EEG-based brain-computer interfaces traditionally employ relatively long training period's for users of such interfaces.

SUMMARY

This disclosure relates to headware for computer control. In accordance with aspects of the present disclosure, the headware includes an inner layer including a first surface and a second surface, an outer layer disposed on the first surface of the inner layer, and at least one sensor disposed on the second surface of the inner layer, the at least one sensor to measure electrical signals from a brain and communicate the electrical signals to a computing device positioned between the inner and outer layer. The headware sits at the top of a head and apply pressure to at least one side of the head.

In an aspect of the present disclosure, the inner layer is comprised of plastic. In another aspect of the present disclosure, the outer layer is comprised of plastic. In an aspect of the present disclosure, the at least one sensor includes at least one electrode. In yet another aspect of the present disclosure, the at least one electrode is arranged in positioning targeting at least one of the following positions of the EEG 10-20 grid system: PO3, PO4, CP1, CP2, T7, T8, C3, C4, FT7, or FCB. In a further aspect of the present disclosure, at least one sensor is replaceable.

In an aspect of the present disclosure, the communicating is wireless including at least one of WIFI®, Bluetooth®, or NFC. In a further aspect of the present disclosure, the headset is configured to distribute and apply pressure evenly to the at least one sensor.

In accordance with aspects of the present disclosure, a headware for computer control is presented. The headware includes an inner layer including a first surface and a second surface, an outer layer disposed on the first surface of the inner layer, and at least one receiving point for placement of at least one sensor therein, the receiving point disposed on the second surface of the inner layer, the at least one sensor configured to measure electrical signals from a brain and communicate the electrical signals to a computing device. The computing device is positioned between the inner layer and the outer layer. The headware sits at the top of a head and apply pressure to at least one side of the head.

In an aspect of the present disclosure, a headware for computer control includes an inner layer including a first surface and a second surface. An outer layer is disposed on the first surface of the inner layer. The headware includes at least one receiving point for placement of at least one sensor therein. The receiving point is positioned between the inner layer and the outer layer. At least one sensor is configured to measure electrical signals from a brain and communicate the electrical signals to a computing device. The computing device is on the headware. The headware sits at the top of a head and applies pressure to at least one side of the head. The receiving point include a first orifice adjacent to the second surface of the inner layer. The first orifice extends in a first direction. A second orifice is in communication with the first orifice and extends along a second direction crossing the first direction. The at least one sensor includes a protrusion configured to be rotatably engaged with the second orifice.

In an aspect of the present disclosure, the receiving point includes a deformable circuit board positioned between the inner layer and the outer layer. The protrusion of the at least one sensor directly contacts the deformable circuit board when the protrusion is rotatably engaged with the second orifice.

In an aspect of the present disclosure, the receiving point includes a deformable block between the deformable circuit board and the outer layer.

In an aspect of the present disclosure, the receiving point includes an indent and the electrode further includes an electrode base. The indent of the receiving point is configured to receive the electrode base therein.

In an aspect of the present disclosure, at least one sensor includes an array of electrode prongs. The number of electrode prongs may vary from 5 to 20, and lengths of the electrode prongs may also vary.

In an aspect of the present disclosure, the electrode may be a flexible electrode. The flexible electrode may include a rigid electrode connector and a plurality of flexible electrode prongs extending from the rigid electrode connector. A distal end of each of the flexible electrode prongs may include a conductive coating.

In an aspect of the present disclosure, the headware further includes at least one extending arm configured to adjust a size of the headware to fit heads of varying sizes. The headware may include a first extending arm and a second extending arm. The second extending arm may be moveable independently of the first extending arm.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1A:
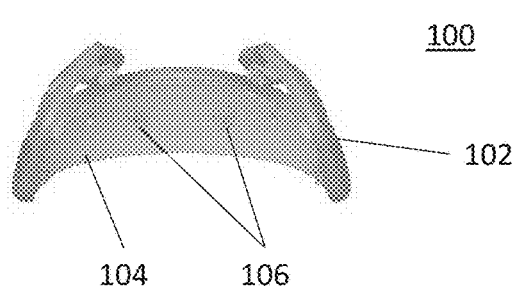
FIG. 1A is an exemplary rear view of a headware for computer control in accordance with the present disclosure.
Figure 1B:
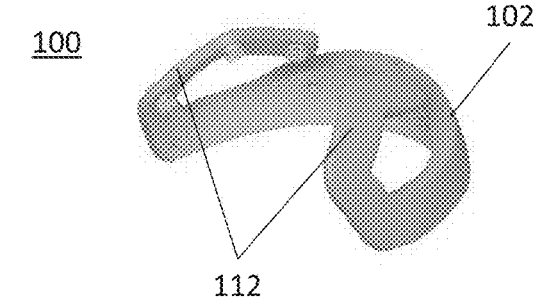
FIG. 1B is an exemplary side view of a headware for computer control in accordance with the present disclosure.
Figure 1C:
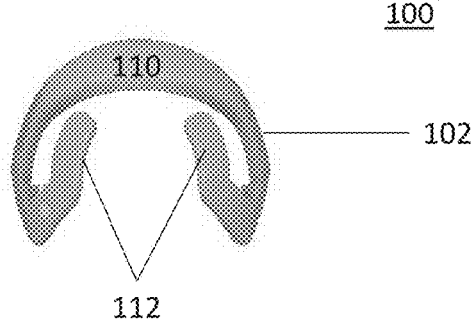
FIG. 1C is an exemplary front view of a headware for computer control in accordance with the present disclosure.
Figure 1D:
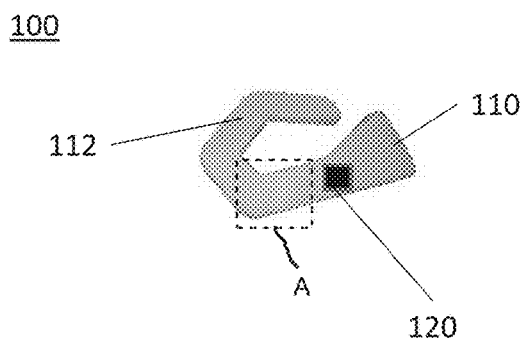
FIG. 1D is an exemplary side view of a headware for computer control in accordance with the present disclosure.

This disclosure relates to computer control. In one aspect, the present disclosure provides a headset for computer control.

As used herein, the term "distal" refers to the portion that is being described which is further from a user, while the term "proximal" refers to the portion that is being described which is closer to a user. Further, to the extent consistent, any of the aspects and features detailed herein may be used in conjunction with any or all of the other aspects and features detailed herein.

Exemplary axes or directions such as an X-axis direction, a Y-axis direction and a Z-axis direction may be illustrated in the accompanying drawings and/or described herein. As an example, the X-axis direction may perpendicular to the Y-axis direction, and the Z-axis direction may be orthogonal to the X-axis direction and the Y-axis direction.

As used herein, the terms parallel and perpendicular are understood to include relative configurations that are substantially parallel and substantially perpendicular up to about + or −10 degrees from true parallel and true perpendicular.

"About" or "approximately" as used herein may be inclusive of the stated value and means within an acceptable range of variation for the particular value as determined by one of ordinary skill in the art, considering the measurement in question and the error associated with measurement of the particular quantity (e.g., the limitations of the measurement system). For example, "about" may mean within one or more standard variations, or within ±30%, 20%, 10%, 5% of the stated value.

Descriptions of technical features or aspects of an exemplary embodiment of the present disclosure should typically be considered as available and applicable to other similar features or aspects in another exemplary embodiment of the present disclosure. Accordingly, technical features described herein according to one exemplary embodiment of the present disclosure may be applicable to other exemplary embodiments of the present disclosure, and thus duplicative descriptions may be omitted herein.

Exemplary embodiments of the present disclosure will be described more fully below (e.g., with reference to the accompanying drawings). Like reference numerals may refer to like elements throughout the specification and drawings.

FIGS. 1A-1D are exemplary embodiments of a headware for computer control in accordance with aspects of the present disclosure. The headware 100 includes a curved band 110, and one or more arms 112 coupled to the curved band 110. The arms 112 and curved band 110 include an inner layer 104 and an outer layer 102. In various embodiments, the inner layer 104 includes a first and a second surface. Disposed on the first surface of the inner layer 104 is an outer layer 102.

In various embodiments, the inner layer 104 and outer layer 102 may include or be made of a resilient material. For example, the inner layer 104 may be formed from a resilient material such as, but not limited to, plastic, while the outer layer 102 may be formed from a resilient material such as, but not limited to, plastic. It is contemplated that other resilient materials may be used for the inner layer 104 and outer layer 102. In various embodiments, the arms 112 may be designed to apply an even amount of clamping force or pressure throughout all contact points to a head. As described below in more detail, the arms 112 may be extendable to adapt to users having heads of varying sizes.

In various embodiments, the inner layer 104 of the curved band 110, may be configured to have receiving points for replaceable sensors 106. In various embodiments, the sensors may be disposed on the inner layer 104 along the curved band and/or the arms. Inner surfaces of the inner and outer layers 102 and 104 each may be at least partially lined with an electrically conductive material to create a faraday cage or faraday shield preventing electromagnetic fields (e.g., electromagnetic fields emitted from electrical or processing components positioned in a space formed between the inner and outer layers 102 and 104) from exiting the inner and outer layers 102 and 104. In embodiments, the sensors 106 may be electrodes. In various embodiments, the headset may include a computing device 120 configured for communicating sensor 106 measurements to another computing device. The computing device 120 may include memory, a processor and a communication circuit. The computing device 120 may independently perform computations on the sensor data. It is contemplated that the communication may be wired or wireless. In various embodiments, the wireless communicating may include, for example, WIFI®, Bluetooth®, or near field communications (NFC).

Figure 2A:
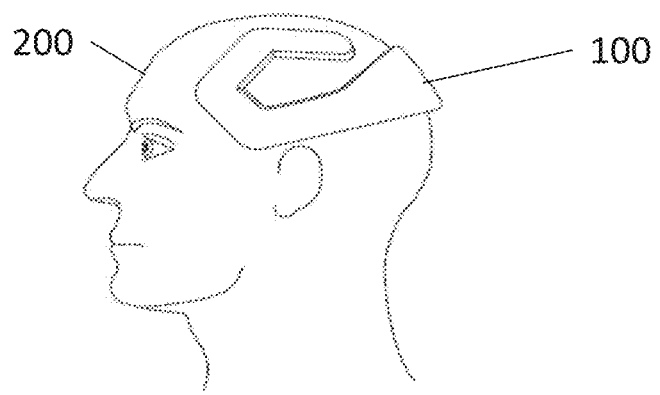
FIG. 2A is an exemplary profile view of the headware of FIG. 1 worn on a human head.
Figure 2B:
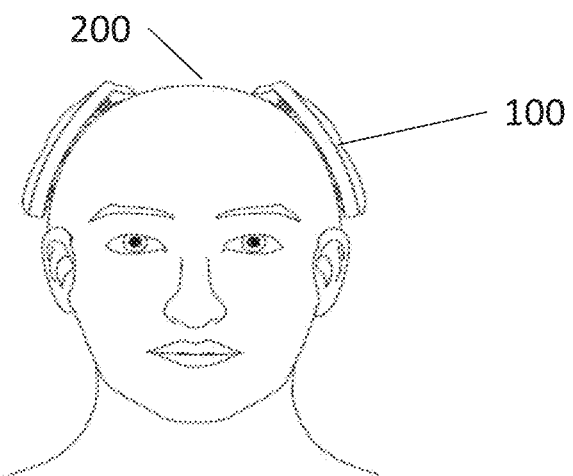
FIG. 2B is an exemplary front view of the headware of FIG. 1 worn on a human head.
Figure 3:
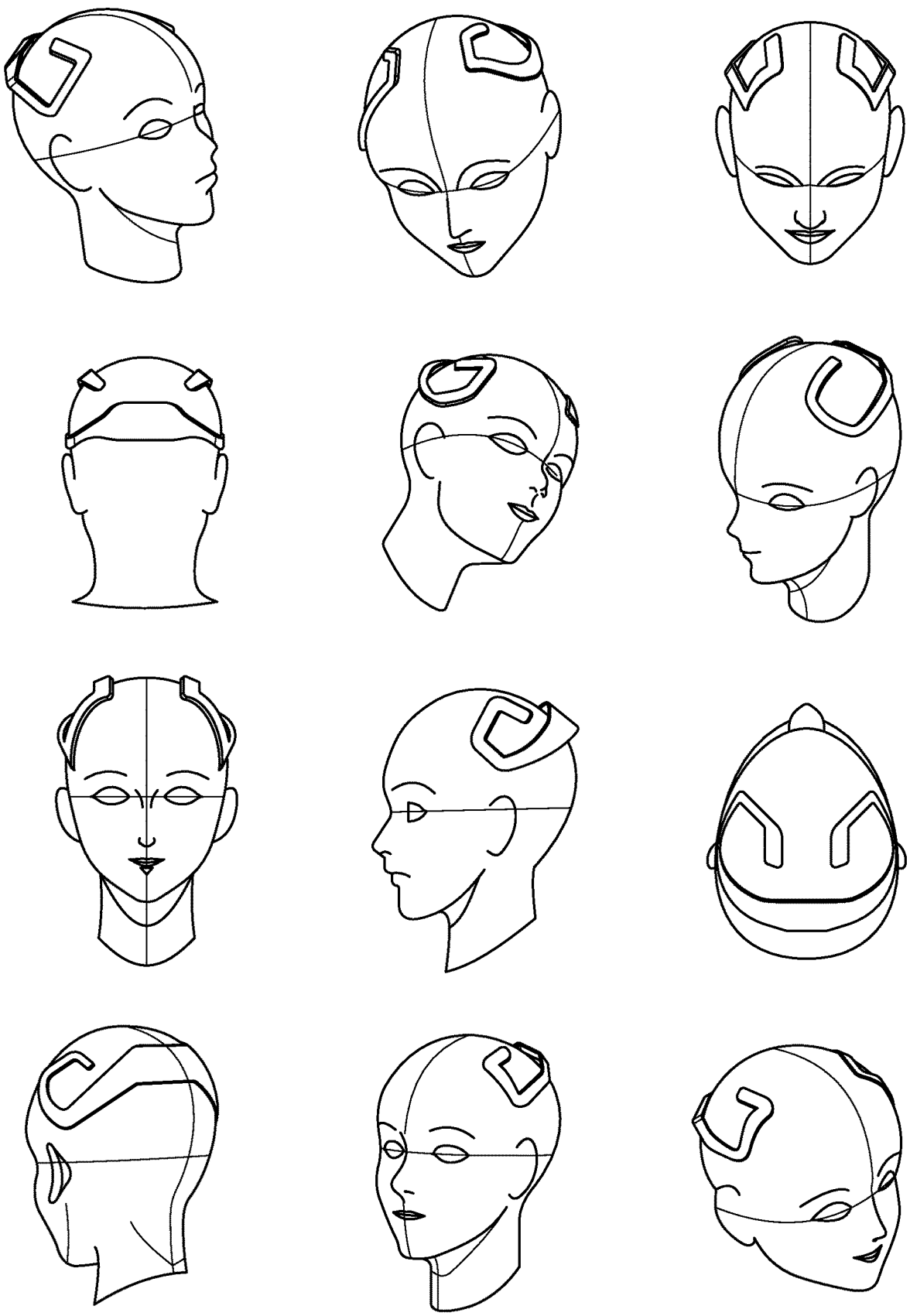
FIG. 3 are various exemplary views of the headware of FIG. 1 worn on a human head

Referring now to FIG. 2A, FIG. 2B, and FIG. 3, there are shown various views of the headware 100 of FIG. 1 on a head 200. In various embodiments, the headware 100 may sit at the top of the head 200 and may apply pressure on both sides of the head 200. In various embodiments, the headware 100 may apply contact on the parts of the head 200 with the least amount of muscle movement. Improved signal quality from the sensors 106 of FIG. 1 may be provided by this maintaining of position of the headware 100 upon the head 200.

Figure 4A:
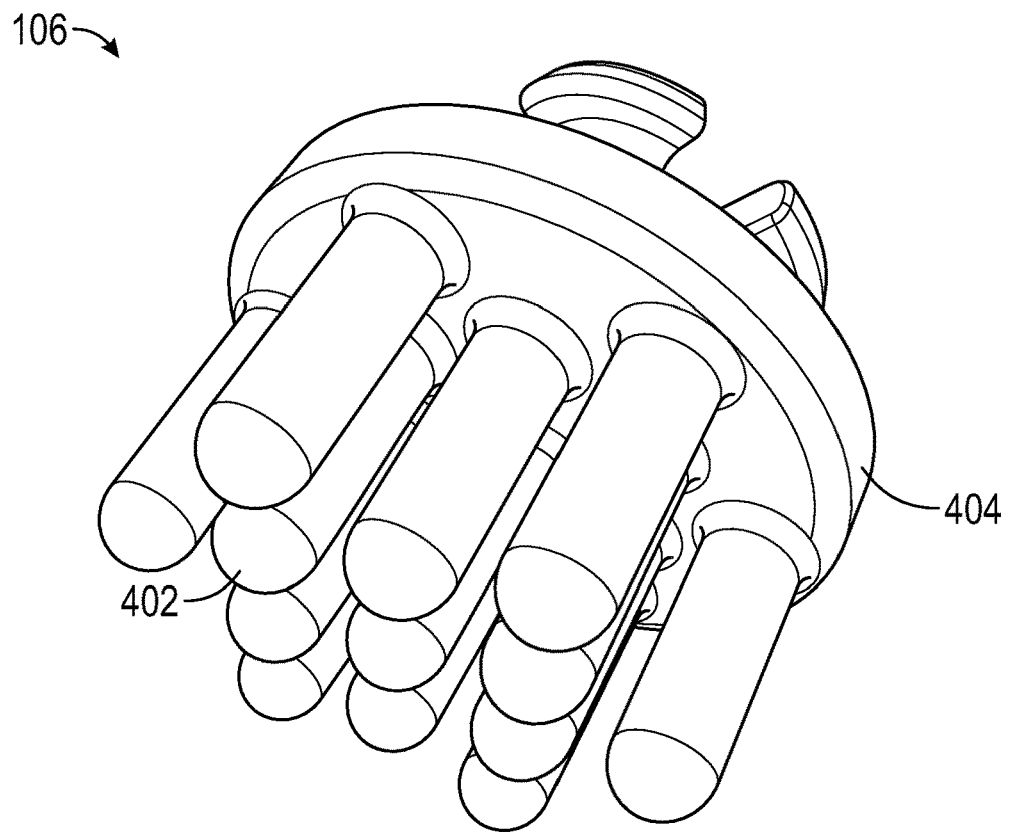
FIG. 4A is an exemplary bottom view of a sensor, in accordance with the present disclosure.
Figure 4B:
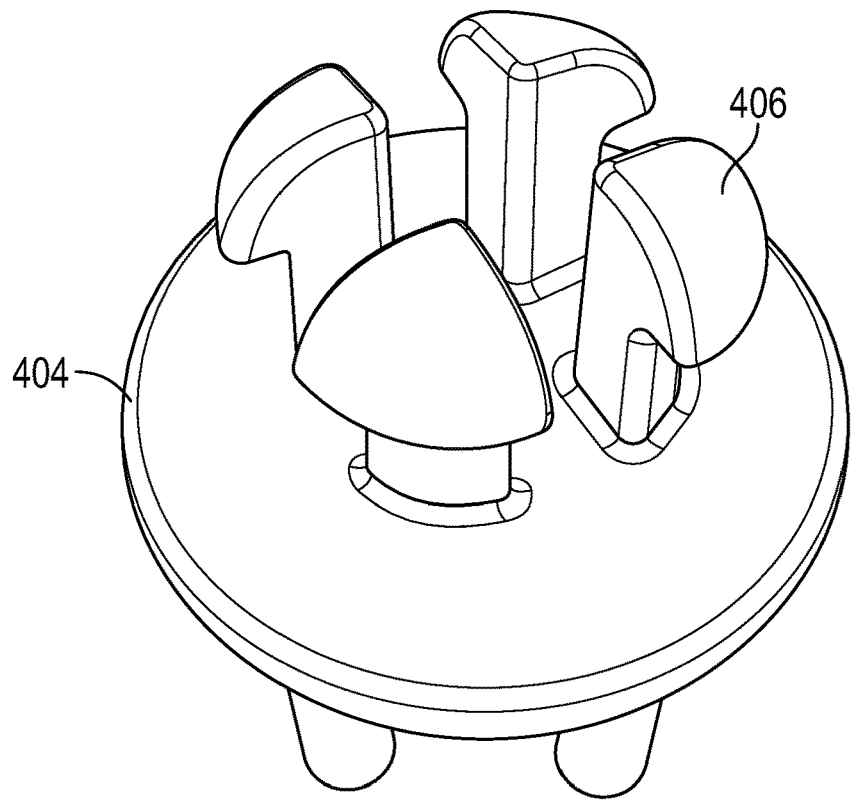
FIG. 4B is an exemplary top view of an electrode, in accordance with the present disclosure.

With reference to FIG. 4A and FIG. 4B, there is shown a sensor 106, in accordance with the present disclosure. In various embodiments, the sensors 106 may include electrodes. In various embodiments, the sensors may snap into a receiving point. The receiving point(s) may be holes located on the inner layer 104 of the headware 100. In various embodiments, the receiving point(s) may be located on the curved band 110 and or on the arms 112.

The sensors 106 record electrical activity and brain waves based on their position on the scalp. The electrical activity and brain waves measured by the brain waves is communicated electrically to a computing device 120. The computing device 120 may then perform computations on the brain waves, communicate the electrical activity and brain waves to another computing device, or store it in an onboard memory. In various embodiments, the computed data from the brain waves, or data form the recorded electrical activity and brain waves may be communicated to a server. It is contemplated that the server may be local, on a remote network, or located on the cloud.

A brain is constantly active, generating electrical activity which is very subtle (significantly less than a 9V battery) but detectable with the sensors 106. Sensors 106 are able to pick up these tiny signals from the scalp surface. EEG signals may relate to cognitive, affective or attentional processing. In various embodiments, the headware 100 may take for example, hundreds to thousands of snapshots of electrical activity across multiple sensors within a single second. In various embodiments, the headware 100 may include an amplifier to amplify the signals that the sensors measure. In various embodiments, conductive gel, paste or cream, typically based on saline, may be used where the sensors contact the scalp. In various embodiments, the sensors may be dry mounted. In various embodiments, the sensors may be covered in a bio-compatible material, not limited to graphene, or Ag/AgCl.

In various embodiments, the measured signals may be used to control computing device 120, or a computer or other computing device. For example, the computing device 120 may run a software application that makes suggestions on when a user should take a break from working. According to another example, the signals measured by the headset 100 may be used to operate a pointer such as a mouse, or control a player in a video game.

Figure 5:
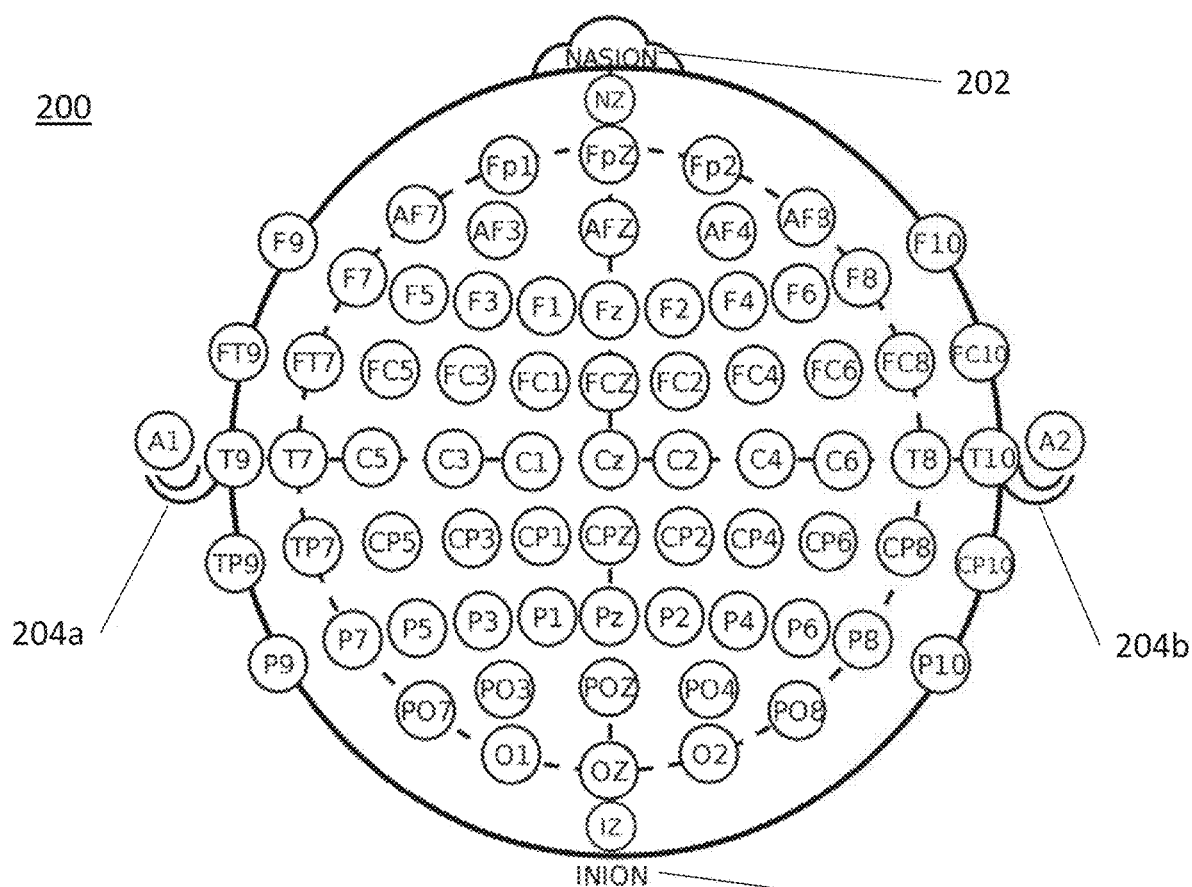
FIG. 5 is a diagram of the International EEG 10-20 grid system.

Referring now to FIG. 5, there is shown an exemplary view of an Electroencephalography (EEG) 10-20 grid system in accordance with aspects of the present disclosure. In the 10-20 system, the electrode names begin with one or two letters indicating the general brain region or lobes where the electrode is placed. Fp=frontopolar; F=frontal; C=central; O=occipital; and T=temporal. Each electrode name ends with a number or letter indicating the distance to the midline. Odd numbers are used in the left hemisphere, even numbers in the right hemisphere. Larger numbers indicate greater distances from the midline, while electrodes placed at the midline are labeled with a "z" for zero. For example, Cz is placed over midline central brain regions. The nasion 202 is the depression between the eyes at the top of the nose. The inion 206 is the bump at the back of the scalp. The left preauricular point 204a and right preauricular point 204b are depressions just anterior to the ears that you can feel with your finger when one opens or closes their mouth.

The headware 100 may record electrical activity and brain waves using sensors 106, such as electrodes, placed on the scalp. Measuring electrical activity from the brain may reflect how the many different neurons in the brain network communicate with each other via electrical impulses. With reference to FIG. 5, the sensors 106 may be placed at positions CP6, F6, C4, CP4, CP3, F5, C3, and/or CP5. It is contemplated that sensors may be located at other positions.

Figure 6:
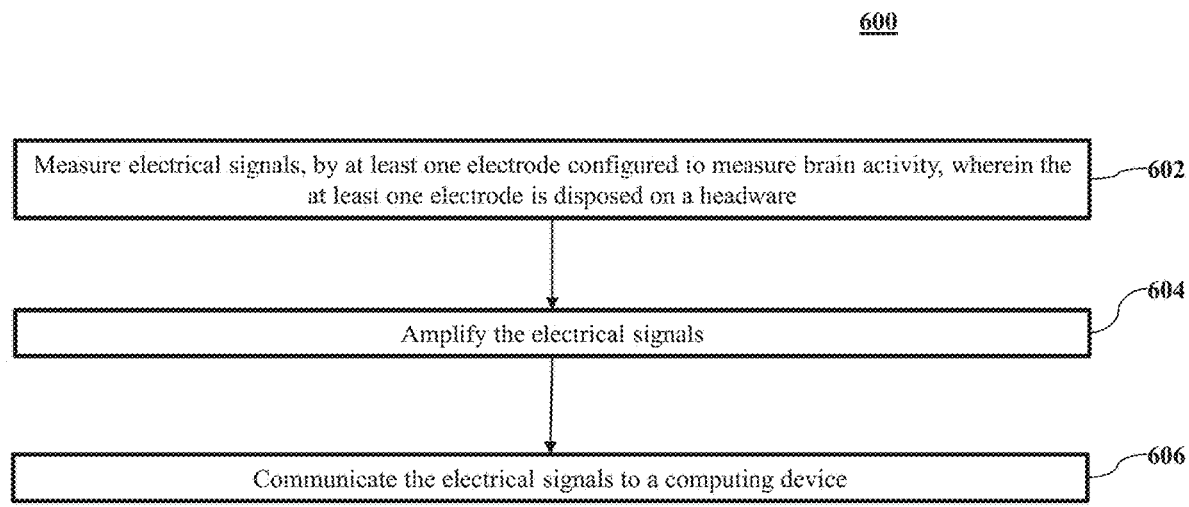
FIG. 6 is an exemplary flowchart of a method of the headware of FIG. 1 controlling a computer.
Figure 7:
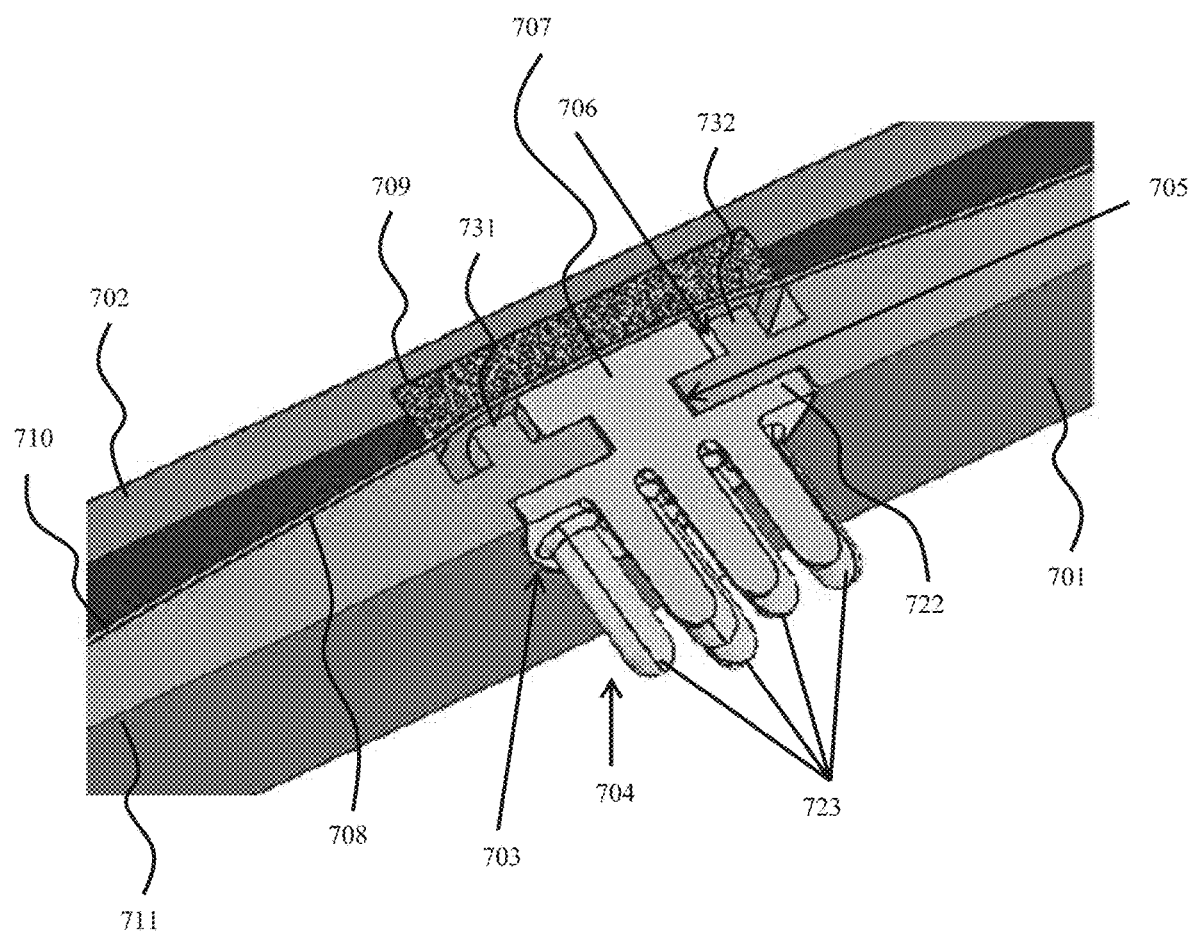
FIG. 7 is an exemplary bottom perspective view of an electrode, in accordance with the present disclosure.
Figure 8A:
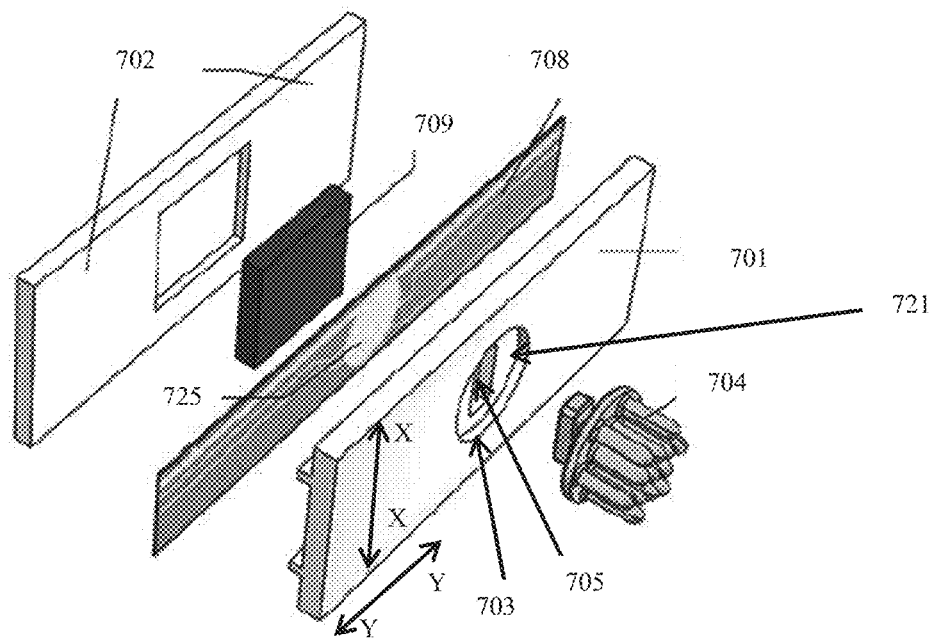
FIG. 8A is an exploded bottom view of the electrode of FIG. 7.
Figure 8B:
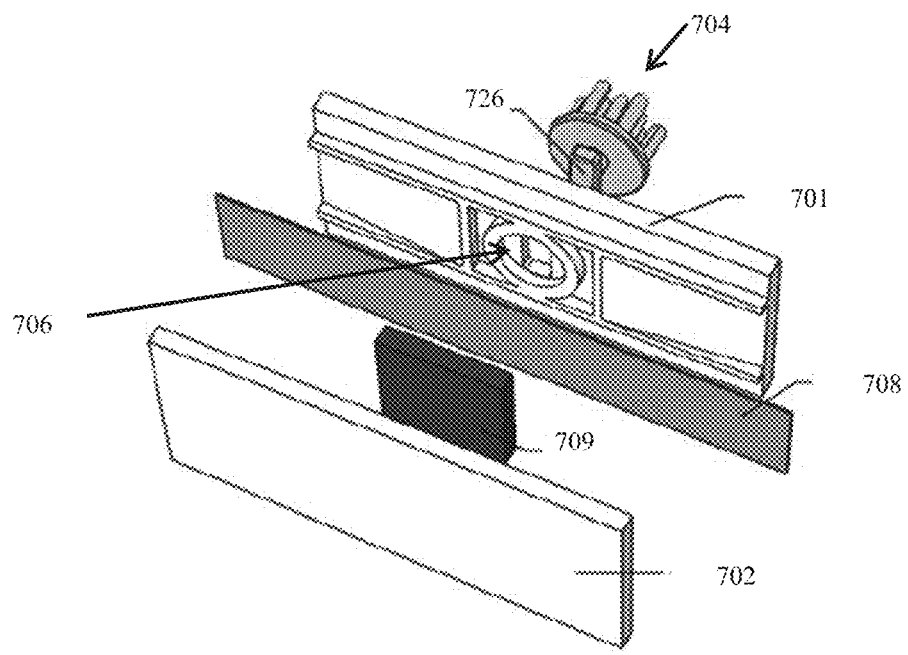
FIG. 8B is an exploded top view of the electrode of FIG. 7.
Figure 9A:
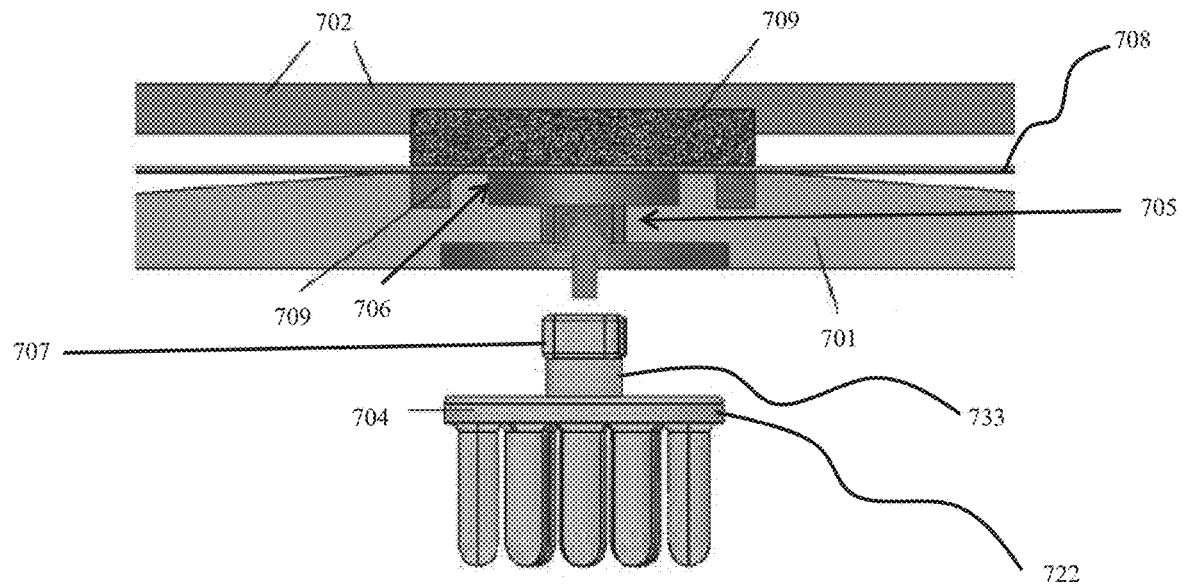
FIG. 9A is a side view of the electrode of FIG. 7 spaced apart from a receiving point.
Figure 9B:
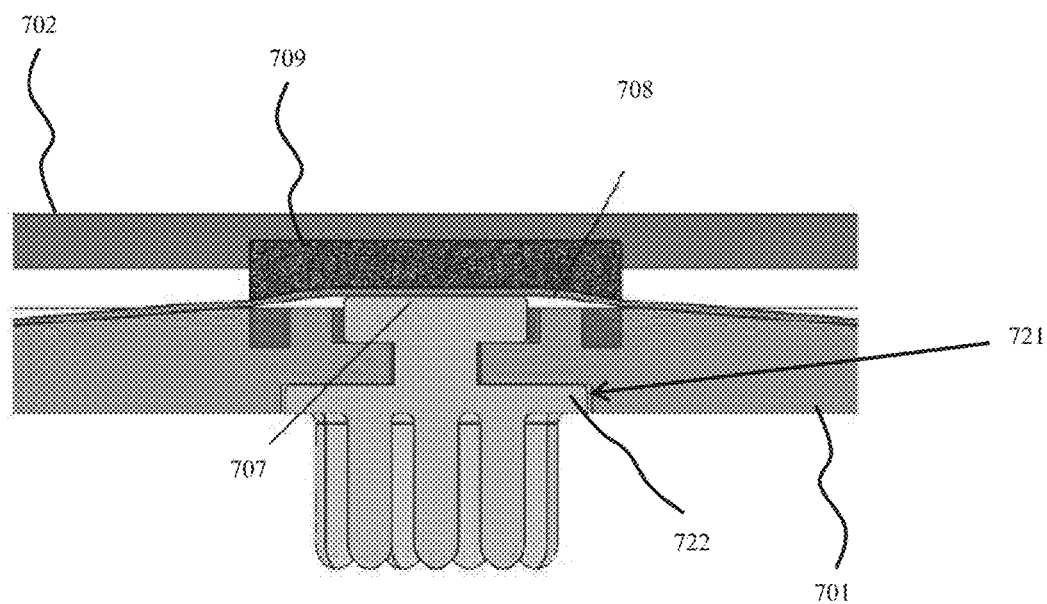
FIG. 9B is a side view of the electrode of FIG. 7 positioned in the receiving point.
Figure 10A:
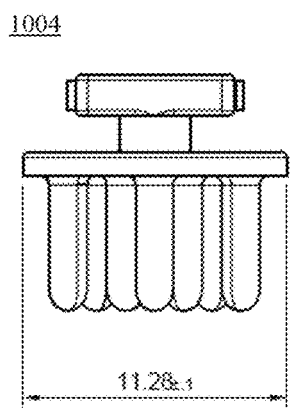
FIGS. 10A-15B each illustrate exemplary electrodes having an exemplary electrode array configuration.
Figure 10B:
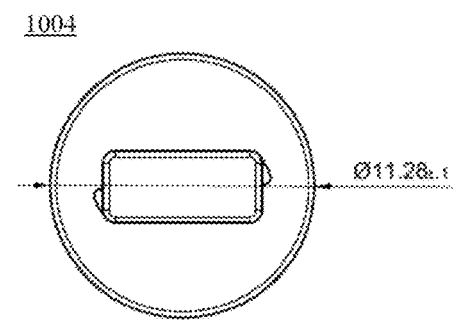
Figure 10C:
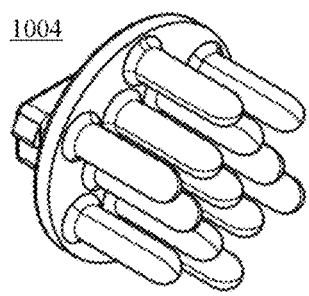
Figure 10D:
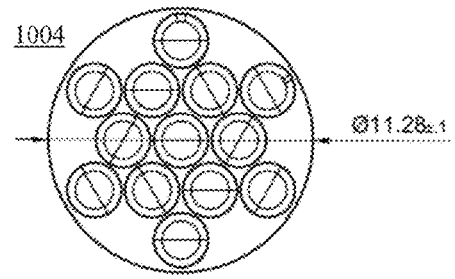
Figures 11A, 11B:
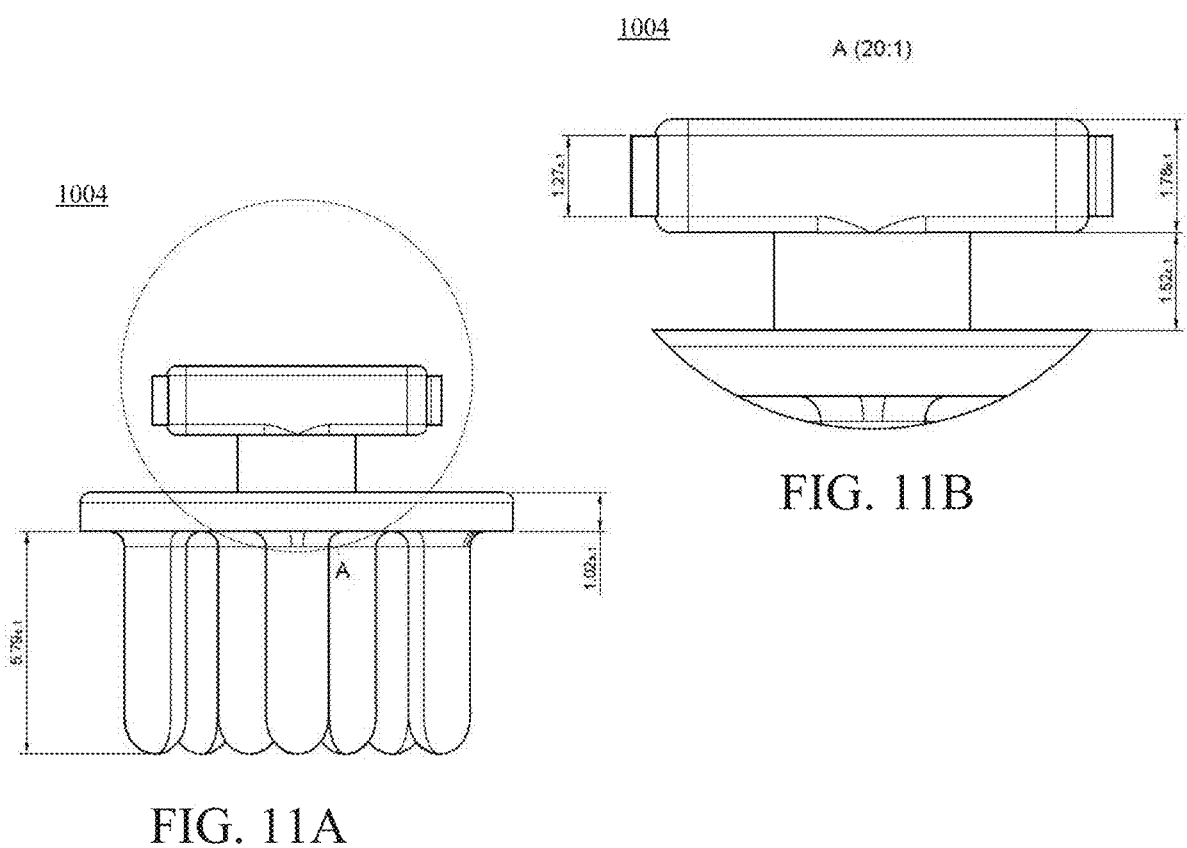
Figure 12:
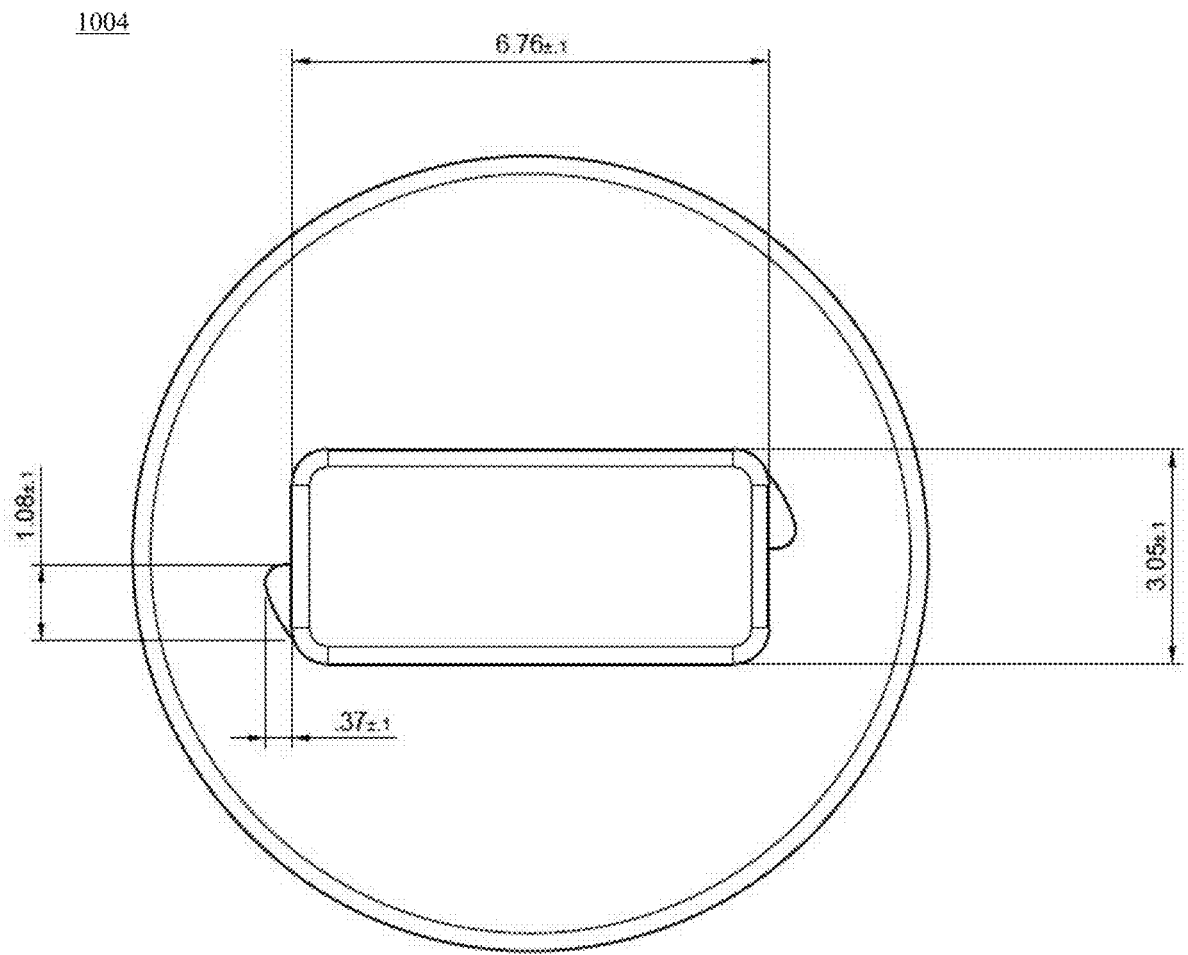
Figure 13:
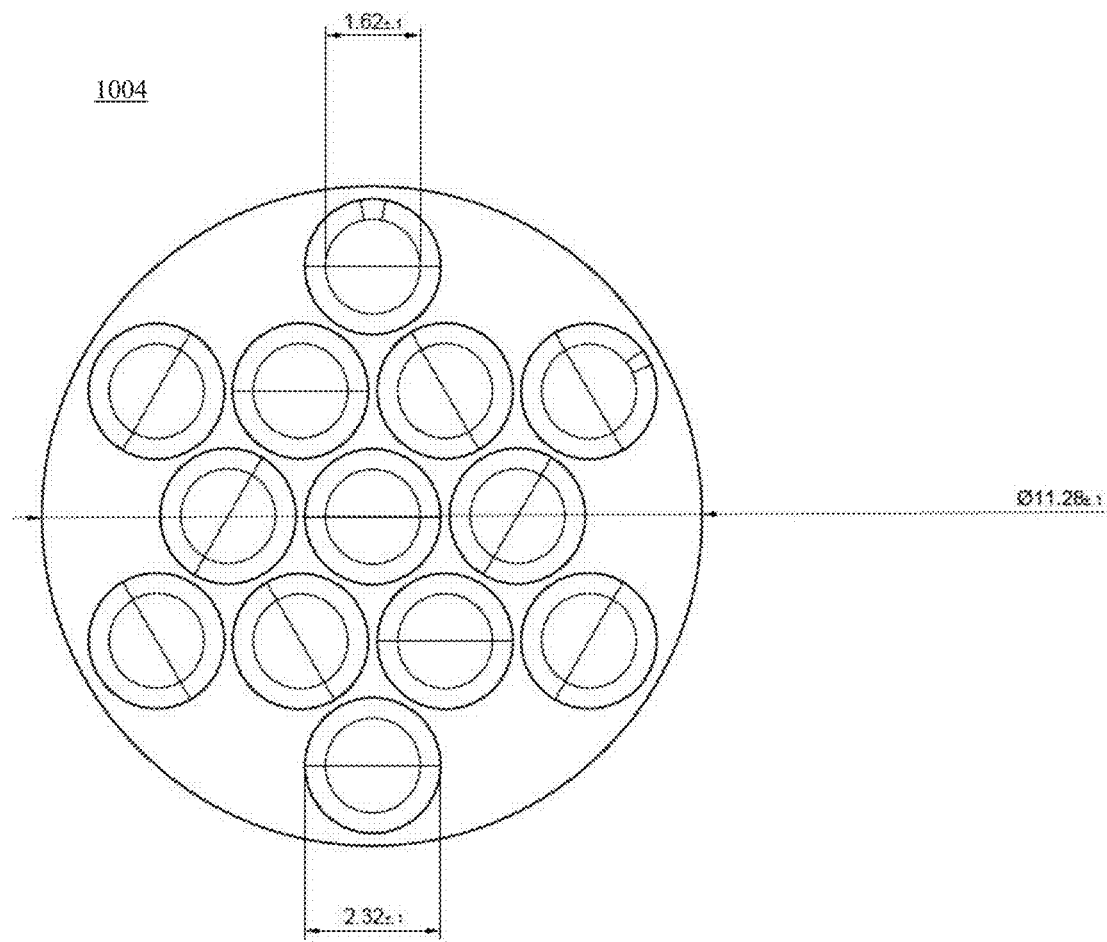
Figure 14A:
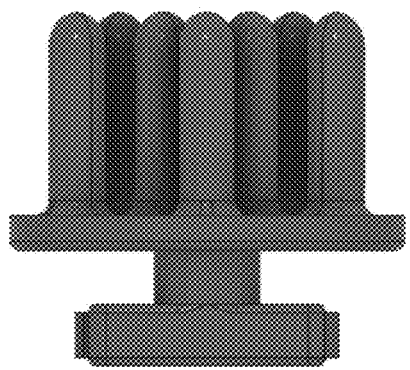
Figure 14B:
Figure 15A:
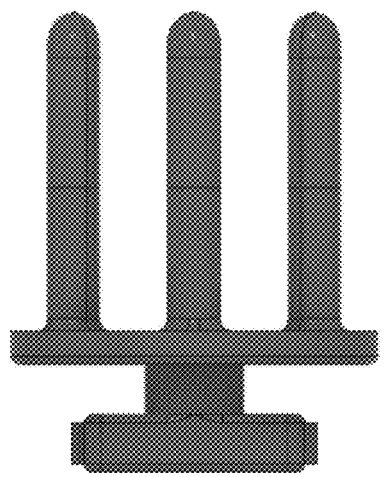
Figure 15B:
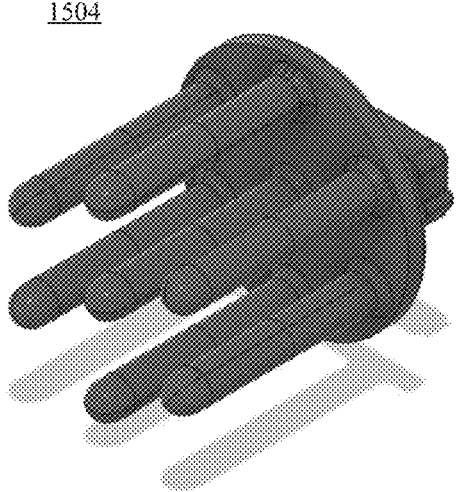

Referring to FIG. 6 is an exemplary flowchart of a method of a headware controlling a computer. In block 602, the headware 100 measures electrical signals of a brain, via the sensors 106 disposed on the headware 100. In various embodiments, the sensors 106 may be electrodes. The signal is communicated from the sensors 106 to an amplifier disposed on the headware 100 and at step 604 amplified. The computing device 120 disposed on the headware then processes these electrical signals and at step 606 communicates them to an external computing device, for controlling that external computing device. For example, a user wearing the headset may want to control his computer to do tasks such as video editing or game playing.

An electrode according to an exemplary embodiment of the present disclosure will be described in more detail below with reference to FIGS. 7, 8A, 8B, 9A, 9B and 10-13. Unless indicated otherwise, the electrode described below with reference to FIGS. 7, 8A, 8B, 9A, 9B and 10-13 may include substantially the same technical features as those described above and thus duplicative descriptions may be omitted below.

Referring to FIGS. 7-9B, in an aspect of the present disclosure, a headware for computer control includes an inner layer 701 including a first surface 710 and a second surface 711. An outer layer 702 is disposed on the first surface 710 of the inner layer 701. The inner layer 701 may be interchangeably referred to as an inner shell and the outer layer 702 may be interchangeably referred to as an outer shell herein.

The headware includes at least one receiving point 703 for securely holding at least one sensor 704 therein. The sensor 704 may be interchangeably referred to as an electrode herein.

The receiving point 703 is positioned between the inner layer 701 and the outer layer 702. At least one sensor 704 is configured to measure electrical signals from a brain and communicate the electrical signals to a computing device. The headware sits at the top of a head and applies pressure to at least one side of the head (see, e.g., FIGS. 2A-3). The receiving point 703 include a first orifice 705 adjacent to the second surface 711 of the inner layer 701. The first orifice extends 705 in a first direction (e.g., an "X-X" direction, as illustrated, e.g., in FIG. 8A). A second orifice 706 is in communication with the first orifice 705 and extends along a second direction (e.g., a "Y-Y" direction, as illustrated, e.g., in FIG. 8A) crossing the first direction. The first direction may be substantially perpendicular to the second direction. The at least one sensor 704 includes a protrusion 707 configured to be rotatably engaged with the second orifice 706 after having passed through the first orifice 705. The first orifice 705 may have a shape corresponding with a shape of the protrusion 707 (e.g., a substantially rectangular shape). The second orifice 706, configured to allow rotation of the protrusion 707, may have a substantially circular shape. A post 733 of the protrusion 707 may have a substantially cylindrical shape.

In an aspect of the present disclosure, the receiving point 703 includes a deformable circuit board 708 positioned between the inner layer 701 and the outer layer 702. The protrusion 707 of the at least one sensor 704 directly contacts the deformable circuit board 708 (e.g., at an electrical contact 725—see, e.g., FIG. 8A) when the protrusion 707 is rotatably engaged with the second orifice 706. This may cause the deformable circuit board 708 to compress slightly against an electrical contact 726 of the sensor 704, thus increasing a strength of contact (and a corresponding electrical connection) between the electrical contact 726 of the sensor 704 and the electrical contact 725 of the deformable circuit board 708.

In an aspect of the present disclosure, the receiving point 703 includes a deformable block 709 between the deformable circuit board 708 and the outer layer 702. The deformable block 709 may be a foam pad, or a polyimide flexible material, a fiberglass material, or any combination of foam pad, polyamide flexible material, and a fiberglass material. A first surface of the foam pad 709 may be in direct contact with an inner surface of the outer layer 702 and a second surface of the foam pad 709 may be in direct contact with an inner surface of the deformable circuit board 708. The deformable block 709 may be positioned in a recess formed in the outer shell 702.

In an aspect of the present disclosure, the receiving point 703 includes an indent 721 and the electrode 704 further includes an electrode base 722. The indent 721 of the receiving point 703 is configured to receive the electrode base 722 therein.

In an aspect of the present disclosure, at least one sensor 704 includes an array of electrode prongs 723. The number of electrode prongs 723 may vary from 5 to 20, and lengths of the electrode prongs may also vary (see, e.g., FIGS. 10A-15B).

According to an exemplary embodiment, support posts 731 and 732 may extend from an inner side of inner layer 1701. The support posts 731 and 732 provide a support structure for the deformable circuit board 708 when an electrode is not positioned in the receiving point 703, thus preventing warping to deformable circuit board 708. Thus, an occurrence of damage to the deformable circuit board 708 may be reduced or eliminated.

FIGS. 10A-15B illustrate various arrangements of exemplary electrodes having electrode arrays including electrode prongs of varying number and sizes. For example, electrode 1004 includes 13 electrode prongs. However, the number of electrode prongs may vary from 5 to 20. Additionally, electrode 1404 illustrates electrode prongs that are relatively shorter than the electrode prongs of electrode 1504. The length and number of electrode prongs may be selected according to a length of a user's hair.

Electrodes having insufficient length might not work on people with long hair. Thus, electrode arrays having longer prongs and a fewer number of prongs may be employed. Simply changing the length of the prong might not be a sufficient modification to penetrate through longer hair. To get through longer hair you can control three variables: number of prongs, space between prongs, and the length of the prongs. The longer the electrode prong, the deeper you can penetrate through a hair layer. The more space between electrodes allows for more penetration through thicker hair. There is an ideal relation to the spacing and number of prongs for each type of hair. By employing the twist lock feature described herein, the electrodes can be quickly replaced and fit to touch the person's head. There is an inverse problem where the reduction in the number of prongs increases the force per prong applied from the electrode to a person's head that can result in an uncomfortable experience. However, the more hair, the more opposing force will be applied to the electrode, which can result in no contact with the scalp. Thus, additional force may be applied to each prong to push through a relatively thick hair layer. For example, a person with no hair may be matched with an electrode array with 20 prongs to distribute the pressure evenly, a person with short hair may be matched with an electrode with 13 prongs, and a person with long hair may be matched with an electrode with 7 prongs. As an example, a person with long hair (e.g., resulting in hair coverage of about an inch in height from the person's scalp), might not be able to use a short 20 prong electrode merely for the fact that the hair is exerting so much normal force back towards electrode body, that the prongs might not make sufficient contact with the scalp.

Figure 16:
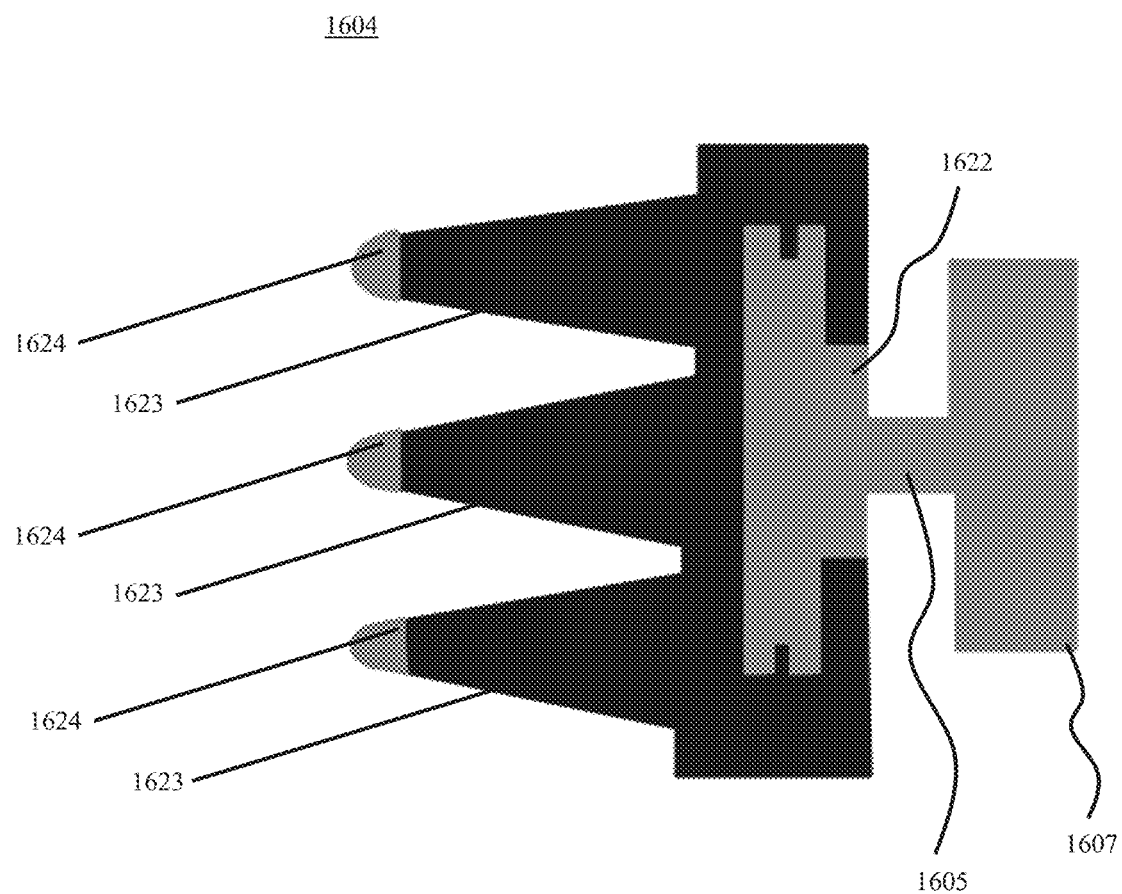
FIG. 16 illustrates a flexible electrode in accordance with the present disclosure.
Figure 17:
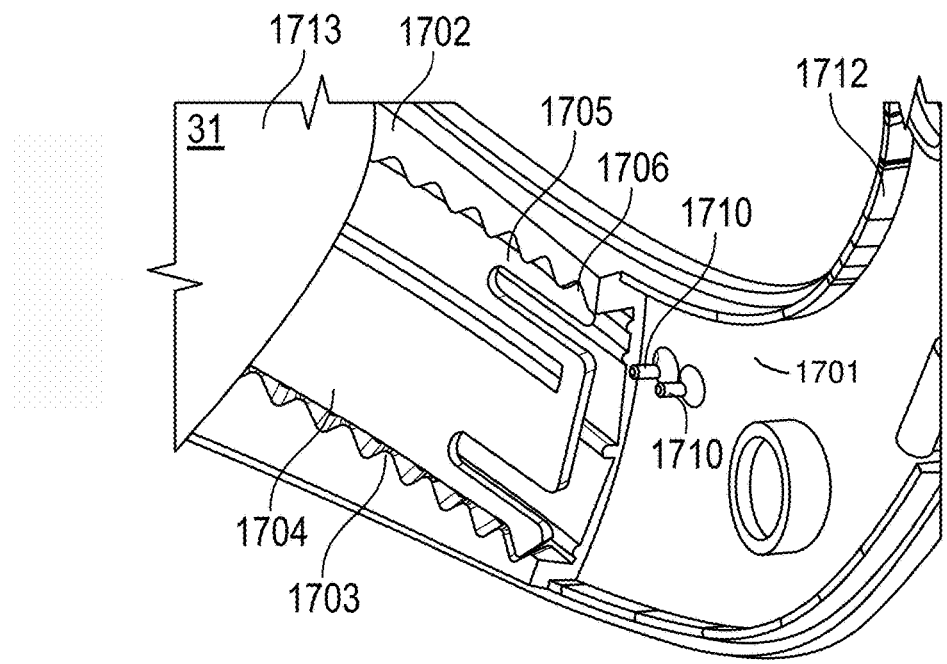
FIG. 17 is an internal view of an extendable arm of a headware in accordance with the present disclosure.
Figure 18:
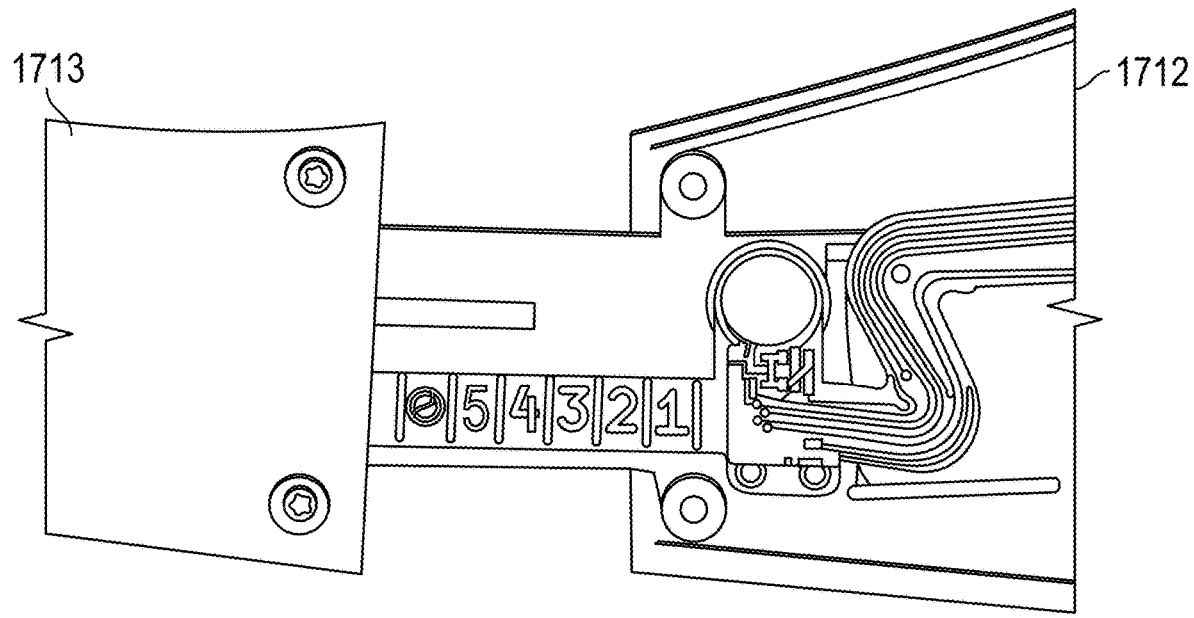
FIG. 18 illustrates various sizes of headware adjusted according to the extendable arm of FIG. 17.
Figure 19:
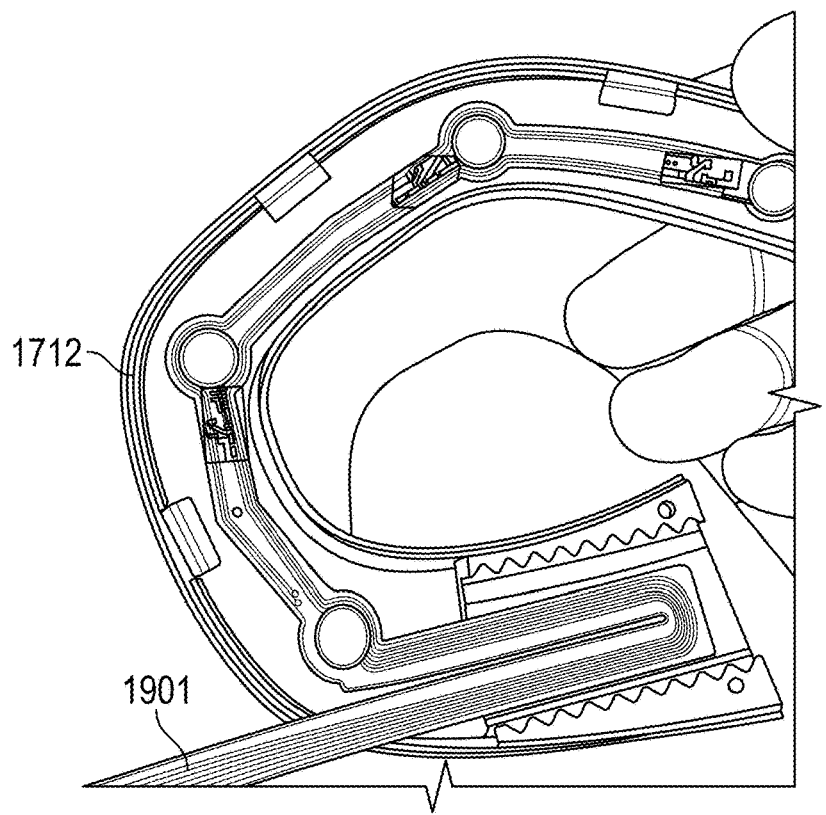
FIGS. 19 and 20 illustrate exemplary extendable wiring of the extendable arm of FIG. 17.
Figure 20:
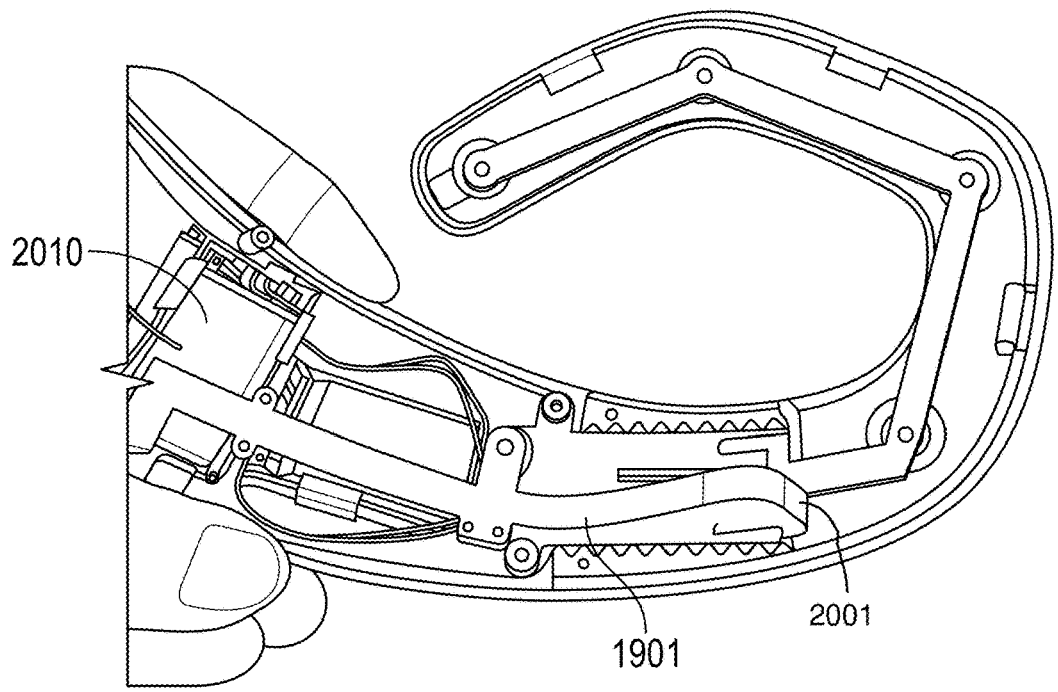

Referring to FIG. 16, in an aspect of the present disclosure, an electrode 1604 may be a flexible electrode. Wherever technically feasible, the flexible electrode 1604 may be substantially the same as the electrode 704 described in more detail above.

The flexible electrode 1604 may include a rigid electrode connector 1622 and a plurality of flexible electrode prongs 1623 extending from the rigid electrode connector 1622. The rigid electrode connector 1622 may be connected with a protrusion 1607 by a post 1605. A distal end of each of the flexible electrode prongs 1623 may include a conductive coating 1624.

The flexible electrode prongs 1623 may each include or be formed of a flexible conductive polymer (e.g., a conductive polymer composite).

A flexible electrode allows for improved electrical contact with a person's head and increased comfort for a user. The flexible electrode can be over-molded on top of a rigid body electrode connector. The conductive flexible material may be coated at the tip of the prong for improved biocompatibility. The flexible electrode may include or may be formed of a flexible plastic mixed with carbon (carbon nanotubes, carbon fibers, graphene), silver, any conductive medium and then formed in an injection or casted mold.

Referring to FIGS. 17-20, at least one of arms 1712 may be extendable. Wherever technically feasible, the arms 1712 may be substantially the same as the arms 112 described above, other than the extending feature described in more detail below. The extendable arms 1712 may adjust to a size of a user's head to all accurate positioning of the sensors positioned about the headware. The extendable arms 1712 may include first and second extendable arms that are moveable independently of each other.

As an example, an inner chamber 1701 between inner and outer layers (e.g., inner layer 701 and outer layer 702) of arm 1712 may include a ratchet slide 1702 including a plurality of teeth 1703 positioned to secure the arm 1712 in a plurality of positions with respect to a base portion 1713 of the headware. The base portion 1713 may include a sliding arm 1704 having first and second compressible protrusions 1705. Each compressible protrusion 1705 may include a locking tooth 1706 having a shape configured to seat between adjacent teeth of the plurality of teeth 1703. Thus, the extendable arms 1712 may be slidably coupled to base 1713 to slide into a number of positions each having a different corresponding size (see, e.g., FIG. 18). This arrangement allows the size of the headware to be adjustable, while still allowing the extendable arms 1712 to be securely positioned with respect to the base portion 1713.

The inner chamber 1701 may include extendable wiring 1901 (e.g., flexible PCB cables that are used to transfer signals back to an amplifier). The extendable wiring 1901 may be employed to electrically connect a number of sensors to each other, as well as to a battery 2010. The extendable wiring 1901 may include a folded loop 2001 configured to allow the wiring to extend when the extendable arms 1712 are moved into various sizing positions. The extendable wiring 1901 folds in two dimensions creating enough "slack" to be used when the extendable arms 1712 are extended to their maximum. The first fold is a flat "turn" on the X axis, and the second fold "curves" over on the Y axis. While the cables are being "pushed" and "pulled" as the extendable arms 1712 extend and collapse, the signal carried by extendable arms 1712 is never compromised.

According to an exemplary embodiment, the inner chamber 1701 may include at least one flexible peg 1710 configured to flexibly secure a printed circuit board within the inner chamber 1701. The flexible pegs 1710 reduce or eliminate an occurrence of damage to the printed circuit board as a result of sliding the extendable arms 1712 into the plurality of sizing positions described above.

As an example, the extendable arms may extend by up to about 23 mm. A number of different lengths (e.g., lengths 1-5 of FIG. 18) may be employed, and spaced apart from each other at approximately 5 mm increments.

According to an exemplary embodiment, the inner chamber 1701 may be at least partially lined with at least one conductive material to form a faraday cage or faraday shield used to block electromagnetic fields from exiting the inner chamber 1701. For example, the computing device described herein, as well as additional electrical, processing or conducting components described herein may emit an electromagnetic field. Forming a faraday cage or faraday shield prevents the electromagnetic field from being transferred outside the inner chamber 1701. Additionally, the faraday cage or faraday shield prevents electromagnetic interference from entering into the inner chamber 1701, thus preventing disruption of sensor readings and corresponding processing.

The electrode may include a base material formed of Acrylonitrile butadiene styrene (ABS), or another similar thermoplastic. Plating of the electrode may include Gold, Silver, or Silver/Silver Chloride. The plating may have a thickness of approximately 5 microns. The electrode may include a base material of electrically conductive thermoplastic.

The receiving point maintains an electrical connection between the sensor and the circuit board. The receiving point also allows the sensor to be removed from the receiving point without having to apply an undesirable amount of pressure to the sensor. Thus, reliability of an electrical connection between the sensor and circuit board may be relatively high, while allowing relatively easy removal of the sensor from the receiving point. Thus, damage to the circuit board or the sensor as a result of detaching the sensor may be reduced or eliminated.

The sensor described herein may include a base plate including an array of sensor projections extending therefrom. The sensor projections may each extend toward a wearer's head. The base plate of the electrode may be disposed on a recess formed in the inner layer. Thus, the base plate may form a co-planar surface with the second surface of the inner layer and a plurality of sensors of the electrode.

As used herein, the term "server," "computer server," "central server," "main server," and like terms are used to indicate a computer or device on a network that manages data.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for controlling components of the headset and communicating data.

As used herein, the term "processor," "computing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, and video game consoles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phasechange random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The headset described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A headware for computer control, the headware comprising:
   a band configured to extend over a first portion of a head of a wearer;
   an arm coupled to the band and configured to extend over a second portion of the head of the wearer;
   a circuit board secured to at least one of the band or the arm;
   at least one sensor configured to measure electrical signals from a brain of the wearer and communicate the electrical signals to a computing device, the at least one sensor including:
      a base portion coupled to the at least one of the band or the arm and in electrical communication with the circuit board, wherein the base portion is rotatably received within an orifice defined in the at least one of the band or the arm; and
      a plurality of electrode prongs extending from the base portion and configured to engage the head of the wearer.

2. The headware according to claim 1, wherein the base portion includes:
   a post; and
   a protrusion extending radially outward from the post, the protrusion rotatably received in the orifice.

3. The headware according to claim 2, wherein the post is axially restrained within the orifice while being rotatable within the orifice.

4. The headware according to claim 2, wherein the orifice includes:
   a first orifice extending in a first direction; and
   a second orifice in communication with the first orifice and extending along a second direction crossing the first direction, wherein the protrusion is rotatably engaged with the second orifice.

5. The headware according to claim 1, wherein the base portion is in electrical contact with the circuit board such that the base portion deforms a contact point of the circuit board.

6. The headware according to claim 1, wherein the circuit board is embedded within the at least one of the band or the arm.

7. The headware according to claim 1, wherein the arm includes an inner layer and an outer layer coupled to the inner layer, the circuit board being positioned between the inner and outer layers.

8. The headware according to claim 1, wherein the arm is extendable relative to the band.

9. A headware for computer control, the headware comprising:
- an inner layer defining an orifice therein;
- an outer layer disposed on the inner layer;
- at least one sensor configured to measure electrical signals from a brain of the wearer and communicate the electrical signals to a computing device, the at least one sensor including:
  - a base portion coupled to the orifice of the inner layer and configured to rotate relative to the inner layer about a longitudinal axis defined by the at least one sensor; and
  - a plurality of electrode prongs extending from the base portion and configured to engage the head of the wearer.

10. The headware according to claim 9, further comprising a circuit board positioned between the inner and outer layers, the base portion being in electrical communication with the circuit board.

11. The headware according to claim 10, wherein the base portion is in electrical contact with the circuit board such that the base portion deforms a contact point of the circuit board.

12. The headware according to claim 9, wherein the base portion includes:
- a post; and
- a protrusion extending radially outward from the post, the protrusion rotatably received in the orifice.

13. The headware according to claim 12, wherein the post is axially restrained within the orifice while being rotatable within the orifice.

14. The headware according to claim 12, wherein the orifice includes:
- a first orifice extending in a first direction; and
- a second orifice in communication with the first orifice and extending along a second direction crossing the first direction, wherein the protrusion is rotatably engaged with the second orifice.

* * * * *